(12) United States Patent
Damon et al.

(10) Patent No.: US 10,899,398 B2
(45) Date of Patent: Jan. 26, 2021

(54) REMOTE OPTICAL WIND DETECTION AND AERODYNAMIC CONTROL SYSTEM FOR GROUND VEHICLE

(71) Applicant: PACCAR Inc, Bellevue, WA (US)

(72) Inventors: Kenneth H. Damon, Fort Worth, TX (US); Jeffrey P. Smith, Prosper, TX (US); Clifton Ellis, Weatherford, TX (US)

(73) Assignee: PACCAR INC, Bellevue, WA (US)

( * ) Notice: Subject to any disclaimer, the term of this patent is extended or adjusted under 35 U.S.C. 154(b) by 283 days.

(21) Appl. No.: 15/993,421

(22) Filed: May 30, 2018

(65) Prior Publication Data

US 2019/0367104 A1 Dec. 5, 2019

(51) Int. Cl.
| | |
|---|---|
| *B62D 37/02* | (2006.01) |
| *B62D 35/00* | (2006.01) |
| *G01S 17/95* | (2006.01) |
| *G01S 17/931* | (2020.01) |

(52) U.S. Cl.
CPC .......... *B62D 37/02* (2013.01); *B62D 35/001* (2013.01); *B62D 35/008* (2013.01); *G01S 17/931* (2020.01); *G01S 17/95* (2013.01)

(58) Field of Classification Search
CPC .... B62D 37/02; B62D 35/008; B62D 35/001; G01S 17/931; G01S 17/95
See application file for complete search history.

(56) References Cited

U.S. PATENT DOCUMENTS

| | | | |
|---|---|---|---|
| 8,196,993 B2 | 6/2012 | Smith | |
| 9,714,057 B2 | 7/2017 | Smith et al. | |
| 2011/0241377 A1 | 10/2011 | Rogers et al. | |
| 2016/0325791 A1* | 11/2016 | Smith ................. | B62D 35/008 |

(Continued)

FOREIGN PATENT DOCUMENTS

| | | |
|---|---|---|
| DE | 10 2008 062 752 A1 | 6/2010 |
| WO | 2014/133424 A1 | 9/2014 |

(Continued)

OTHER PUBLICATIONS

WIPO WO 2014/133424 (Year: 2014).*

(Continued)

*Primary Examiner* — Alan D Hutchinson

(57) ABSTRACT

An aerodynamic control system for a ground vehicle comprises a LiDAR module including at least one LiDAR sensor configured to obtain wind data upstream of the ground vehicle; a computing device; an aerodynamic device controller; and an aerodynamic device including a control surface. The computing device is configured to receive the wind data from the LiDAR module and generate output signals based on the wind data. The aerodynamic device controller is configured to receive the output signals from the computing device and generate control signals to control the aerodynamic device to adjust aerodynamic properties of the ground vehicle based at least in part the wind data. Changes to the configuration of the control surface may include increasing or decreasing a deflection angle of the at least one aerodynamic device. The aerodynamic device may include, e.g., a pneumatically actuated aerodynamic device or an electro-mechanically actuated aerodynamic device.

12 Claims, 10 Drawing Sheets

(56) References Cited

U.S. PATENT DOCUMENTS

2018/0210447 A1* 7/2018 Myers .................. B60W 50/14
2019/0163205 A1* 5/2019 Kodera ................ G05D 1/0295

FOREIGN PATENT DOCUMENTS

WO      2015/133965 A1    9/2015
WO      2016/182950 A1   11/2016

OTHER PUBLICATIONS

Extended European Search Report dated Oct. 23, 2019, issued in corresponding European Application No. EP 19177676.4, filed May 31, 2019, 10 pages.
American Institute of Physics, "New Wind Measurement Technology May Help Olympic Sailing, Aviation and Weather Forecasting," ScienceDaily, Jul. 3, 2008, <https://www.sciencedaily.com/releases/2008/06/080630104637.htm> [retrieved May 24, 2018], 3 pages.
"Lidar," Wikipedia, the Free Encyclopedia, May 14, 2018, <https://en.wikipedia.org/wiki/Lidar> [retrieved May 17, 2018], 27 pages.
Simley, E., and L.Y. Pao (University of Colorado, Boulder), "LIDAR Wind Speed Measurements of Evolving Wind Fields," National Renewable Energy Laboratory (NREL), Subcontract Report No. NREL/SR-5000-55516, Contract No. DE-AC36-08GO28308, Jul. 2012, 44 pages.
Tanguay, B., "On the critical importance of aerodynamics for the energetic efficiency of heavy-duty vehicles," National Research Council Canada, Heavy Duty Vehicle GHG Emissions & Fuel Efficiency in Canada Conference, Winnipeg, Apr. 2012, 36 pages.
European Communication in Application 19177676.4, dated Nov. 4, 2020, 5 pages.

* cited by examiner

REMOTE OPTICAL WIND DETECTION AND AERODYNAMIC CONTROL SYSTEM FOR GROUND VEHICLE

STATEMENT OF GOVERNMENT LICENSE RIGHTS

This invention was made with Government support under contract number DE-EE0007761 awarded by the U.S. Department of Energy. The Government has certain rights in the invention.

BACKGROUND

In the field of surface transportation and particularly in the long-haul trucking industry, even small improvements in fuel efficiency can reduce annual operating costs significantly. It is therefore advantageous in the design of a vehicle to reduce drag forces, thereby improving the aerodynamic properties and efficiency of the vehicle.

An over-the-highway cargo hauling tractor-trailer combination is one vehicle that experiences excessive aerodynamic drag attributable to a variety of causes. Tractor-trailer combinations typically include a tractor having a so-called fifth wheel by which a box-like semi-trailer may be articulatedly attached to the tractor for transportation of the semi-trailer. By providing the articulated connection via the fifth wheel, a space or gap is formed between the aft facing rear wall of the tractor cab and the forward facing front wall of the semi-trailer. This gap, or the gap between succeeding trailers of a tractor-trailer combination, causes wake regions and, as a result, aerodynamic drag. Another reason for large pressure drag on tractor-trailer combinations is the configuration of the tractor front section, particularly, the presence of a sharp angle located at a lower edge of the truck bumper and the passage of airflow underneath the vehicle and associated trailer.

Although various devices have been developed for reducing drag on such vehicles (see, e.g., U.S. Pat. No. 8,196,993, which is incorporated herein by reference), such devices have previously been unable to effectively respond to many air flow conditions, such as crosswind conditions that change while the vehicle is in operation. If vehicle designs are tailored to only to typical wind conditions for a vehicle's on-road duty cycle, performance may suffer when winds are not consistent with those conditions.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, a method for changing a configuration of a control surface of an aerodynamic device on a ground vehicle comprises, by a LiDAR (light detection and ranging) module including at least one LiDAR sensor mounted on the ground vehicle, obtaining wind data (e.g., a wind vector field) for a location upstream of the ground vehicle; and changing the configuration of a control surface of at least one aerodynamic device based at least in part on the wind data obtained by the LiDAR module. Changing the configuration of the control surface may include receiving, by a computing device, the wind data from the LiDAR module; generating, by the computing device, output signals based on the wind data; transmitting, by the computing device, the output signals to an aerodynamic device controller; and generating, by the aerodynamic device controller, control signals based at least in part on the output signals received from the computing device. The control signals are configured to change the configuration of the control surface to adjust aerodynamic properties of the ground vehicle based on the wind data.

In another aspect, an aerodynamic control system for a ground vehicle comprises a LiDAR module including at least one LiDAR sensor configured to obtain wind data; a computing device including a processor and memory; an aerodynamic device controller; and an aerodynamic device including a body defining a control surface. The computing device is configured to receive the wind data from the LiDAR module and generate output signals based on the wind data. The aerodynamic device controller is configured to receive the output signals from the computing device and generate control signals to control the aerodynamic device to adjust aerodynamic properties of the ground vehicle based at least in part the wind data. The system may further include a pneumatic system configured to receive and respond to the control signals. The system may further include a trailer gap distance sensor.

In any of the above aspects, changes to the configuration of the control surface may include increasing or decreasing a deflection angle of the at least one aerodynamic device. The aerodynamic device may include, e.g., a pneumatically actuated aerodynamic device or an electro-mechanically actuated aerodynamic device. For a pneumatically actuated aerodynamic device, changes to the configuration of the control surface may include increasing or decreasing pressure in response to at least one of the control signals. Changes to the configuration of the control surface may be further based on additional factors, such as a trailer gap distance.

In another aspect, a method for modifying operation of a surface vehicle to improve aerodynamic performance of the surface vehicle comprises, by a LiDAR module including at least one LiDAR sensor mounted on the surface vehicle, obtaining wind data for a location upstream of the surface vehicle; and automatically altering the operation of the surface vehicle based at least in part on the wind data obtained by the LiDAR module such that the aerodynamic performance of the surface vehicle is improved. For example, where the vehicle is a tractor-trailer combination, the wind data may indicate a flanking wind gust. In this situation, automatically altering the operation of the vehicle comprises leaning a cab of the tractor into the flanking wind gust to shield a corner of the trailer. Alternatively, automatically altering the operation of the vehicle may include activation of a steering-assist mechanism to counter-steer the vehicle into a flanking wind gust. As another example, where the wind data indicates a platoon wake, automatically altering the operation of the vehicle may include locating and maintaining a position of the vehicle in the platoon wake. As another example, where the wind data indicates a headwind ahead of the surface vehicle, automatically altering the operation of the vehicle may include reducing cruise speed in order to reduce effective air speed to mitigate fuel economy deterioration effects that the headwinds may otherwise cause for the vehicle.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
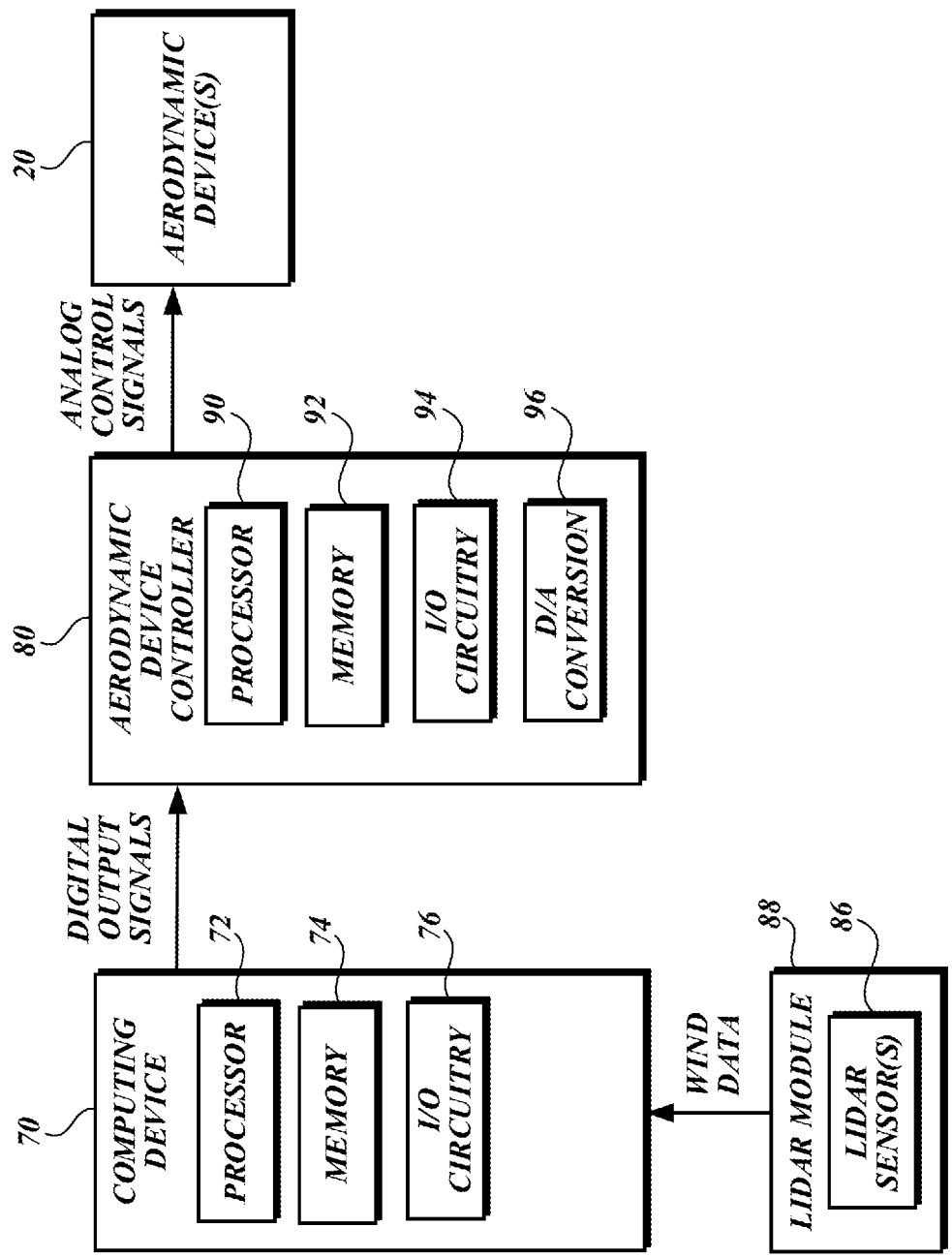
FIG. 1 is a block diagram of an illustrative aerodynamic device control system comprising a light detection and ranging (LiDAR) module that is used to detect and respond to wind conditions according to an embodiment of the present disclosure.

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed. Similarly, any steps described herein may be interchangeable with other steps, or combinations of steps, in order to achieve the same or substantially similar result.

The following discussion provides examples of devices and methods for improving the aerodynamic efficiency (e.g., reducing drag) on vehicles, such as class 8 tractor-trailer combinations. Generally described, embodiments disclosed herein are directed to techniques and systems for obtaining wind data upstream of a ground vehicle and dynamically adjusting physical characteristics or operation of the vehicle based on the wind data. In some embodiments, a system includes a remote optical sensor (e.g., a LiDAR sensor), signal processing, and transformable vehicle body elements or aerodynamic devices (e.g., air dams, spoilers, wings, air deflectors, fairings, or a combination of such devices) to provide superior aerodynamic performance. The system detects future wind conditions (that is, wind conditions ahead of the vehicle in its direction of travel) and sends commands to corresponding controllers to adapt to such conditions ahead of time before the vehicle experiences those conditions. Embodiments of the present disclosure may find use, among others, in vehicles that experience crosswinds ranging from, e.g., a 3 degree yaw up to crosswinds at a 20 degree yaw or more.

In described embodiments a LiDAR (light detection and ranging) module includes at least one LiDAR sensor (e.g., a laser scanner) mounted on the vehicle. The LiDAR module detects wind data (e.g., in the form of a wind vector field) at a desired distance from the vehicle. The LiDAR module has the ability to obtain such wind data from a free-stream area upstream of the vehicle (e.g., at a range of 60 m or more), before the air flow is affected by the vehicle. This allows more accurate detection of wind conditions compared to conventional instruments that detect wind conditions near the vehicle. Further, depending on the range of the LiDAR sensors of the LiDAR module, the wind conditions may be detected at a location ahead of a vehicle traveling at highway speeds. This allows time (e.g., 2 seconds, 3 seconds, or some other desired length of time) for adjustments to be made to the configurations of the aerodynamic devices, in order to adapt to the detected wind conditions. Adjustments to the range or direction of the LiDAR sensors can be made to adjust for factors such as vehicle speed, terrain, traffic conditions, etc.

Any kinetic or adjustable aerodynamic devices may be used in combination with the disclosed embodiments. Such devices may include pneumatically actuated or electromechanically actuated devices, such as deflectors. In some embodiments, the aerodynamic devices include pneumatic motors for making adjustments to the devices. In such devices, a predetermined amount of pressurized gas can be injected into one or more of the pneumatic motors of an aerodynamic device based on sensed wind conditions. As the pressurized gas enters or exits the pneumatic motors, the pneumatic motors affect a corresponding change in the control surface of the aerodynamic device proportional to the pressure contained by the motor. A corresponding change in pressure can be used to change the control surface configuration of the aerodynamic device, allowing for drag reduction by the aerodynamic device during use.

Compared to systems that use mechanical instrumentation to detect wind conditions near the surface of the truck body, the disclosed embodiments provide several advantages, e.g., (1) the ability to detect future wind conditions before the vehicle experiences them, thereby reducing response lag; (2) improved accuracy of remote sensing, as winds measured at a distance from the vehicle are not affected by the vehicle itself; (3) the ability to mount sensors internally to the vehicle body to as to avoid additional form drag or exposure to environmental hazards that can limit the effectiveness of mechanical instruments, such as ice and debris; and (4) reduction or elimination of moving parts.

Although some embodiments of the present disclosure will be described with reference to a Class 8 truck, one skilled in the relevant art will appreciate that the disclosed embodiments are illustrative in nature, and therefore, should not be construed as limited to applications with a Class 8 truck and/or trailer. It should therefore be apparent that the techniques and methodologies set forth by one or more representative embodiments of the present disclosure have wide application, and may be used in any situation where a reduction in drag forces on a vehicle (e.g., passenger car or truck, RV, vessel, train, bus, trailer, etc.) is desirable. Additionally, it should be apparent that the techniques and methodologies set forth by one or more representative embodiments of the present disclosure can be employed in any situation where dynamic control of the configuration of a surface or part may be desirable.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

FIG. 1 is a block diagram of an illustrative aerodynamic device control system comprising a remote optical wind detection module (e.g., a LiDAR module) that is used to allow a vehicle to detect and respond to wind conditions, according to an embodiment of the present disclosure. In the example shown in FIG. 1, an aerodynamic device controller 80 selectively controls the configuration of one or more aerodynamic devices 20, such as deflectors. The controller 80 is configured to receive signals based on wind condition data obtained by a LiDAR module 88 and generate control signals to selectively control the configuration of the aerodynamic devices 20 based on the wind conditions. The controller 80 may also receive and respond to additional signals from other sources that are indicative of other conditions that may affect the aerodynamic properties of the vehicle, such as a trailer gap distance. The aerodynamic devices 20 receive appropriate device specific control signals from the controller 80 (e.g., for opening and/or closing one or more valves) in order to change the configurations of one or more control surfaces.

The LiDAR module 88 comprises one or more LiDAR sensors 86 (e.g., laser scanners). LiDAR technology uses lasers to emit laser light pulses and detect returns (e.g., via backscattering) of those pulses as they interact with objects or substances. Because the speed of light is a known constant, the time that elapses between a pulse and a corresponding return can be used to calculate the distance between the sensor and an object or substance. LiDAR has many applications, such as range-finding and terrain mapping, that involve detecting reflections from opaque objects or materials. However, LiDAR also can be used to detect the direction and speed of air flow, such as atmospheric winds.

In embodiments of the present disclosure, signals received by the controller 80 include signals indicative of air flow conditions, such as crosswind conditions, detected by the LiDAR module 88. The LiDAR module 88 calculates the direction and magnitude of air flow with respect to the longitudinal axis of the vehicle. In an embodiment, the LiDAR module determines wind speed and direction in X, Y, and Z dimensions relative to the position of the LiDAR sensors. The elevation, direction, and size of the detection range can be adjusted based on factors such as the speed or type of the vehicle; traffic, weather, or terrain conditions; or user preferences.

Figure 2:
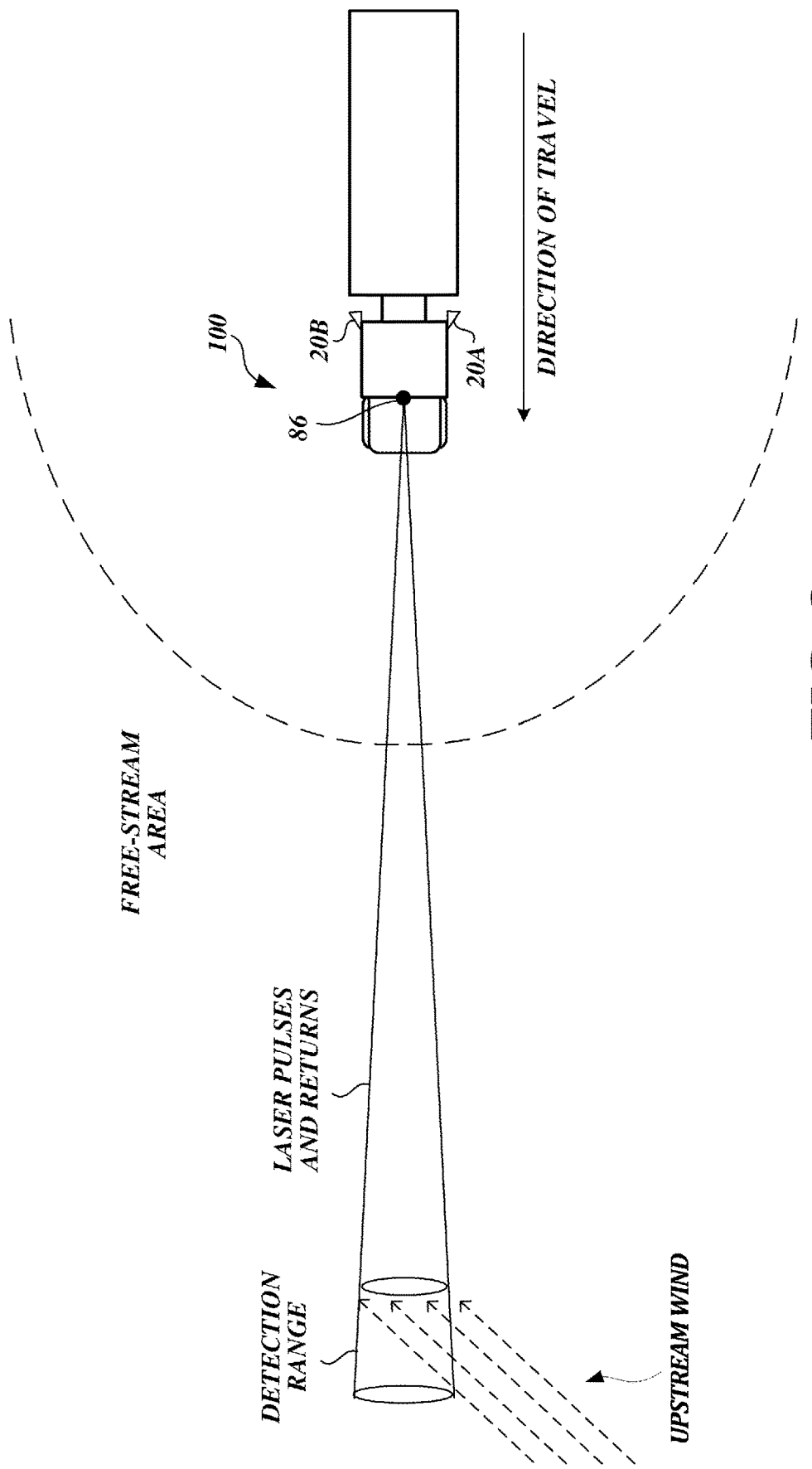
FIG. 2 is a schematic diagram of an illustrative usage scenario in which LiDAR technology is used to obtain wind data according to an embodiment of the present disclosure.

FIG. 2 is a schematic diagram of an illustrative usage scenario in which LiDAR technology is used to obtain wind data according to an embodiment of the present disclosure. As mentioned above, the LiDAR module 88 includes one or more LiDAR sensors 86. The LiDAR sensors 86 include one or more laser scanners that emit laser pulses forward from the vehicle and detect the timing and other characteristics (such as changes in angle or frequency) of the returns of those pulses. The number of pulses and returns may vary depending on implementation, such that different sampling rates of detected wind speed and direction are possible. For example, measurements of wind speed and direction may be taken at a rate of 1 Hz to 100 Hz, e.g., 20 Hz. Further, the geometry of such pulses (e.g., 2D scanning, 3D scanning, or some combination) may vary depending on implementation. In the example shown in FIG. 2, the LiDAR sensors detect upstream wind conditions in a forward direction of travel. Depending on configuration, this data may be detected in a free-stream area (shown to the left of the dashed arc) where the vehicle (e.g., tractor-trailer combination 100) has not yet affected the air flow.

The LiDAR module can be configured to detect wind conditions at a wide range of distances and elevations. In some embodiments a range of 60 m to 120 m may be preferred. Longer range detection (e.g., 1 to 2 km) or shorter range detection (e.g., less than 60 m) also can be used. In some embodiments an elevation of 5 to 10 m is preferred. However, lower (e.g., ground level) or higher elevation ranges also can be used. Mounting hardware can be adjusted (e.g., manually, automatically, or by remote control) to point the LiDAR sensors in a desired direction.

To focus on a particular detection range, the LiDAR module 88 can be configured to focus only on returns that fit within a desired range of elapsed time between the pulse and the detected return. In this way, returns from ranges deemed too close or distant to be useful can be filtered out from the results. Other filtering techniques, such as a median filter, also can be used for noise reduction or to remove spurious data. The wind condition data that is detected can then be used to adjust the configuration of aerodynamic devices on the vehicle, such as side deflectors 20A and 20B.

Referring again to FIG. 1, in order to receive and process incoming signals and generate the appropriate device-specific control signals, the illustrative controller 80 includes a logic system. It will be appreciated by one skilled in the art that the logic may be implemented in a variety of configurations, including software, hardware (analog and/or digital), and/or combinations of software and hardware. For example, the controller 80 may include a processor 90, a memory 92, and input/output (I/O) circuitry 94. The memory 92 may include random access memory (RAM), read only memory (ROM), or any other type of digital data storage means. The I/O circuitry 94 may include conventional buffers, drivers, relays, etc., and the like, for sending device specific signals to control the aerodynamic devices. To facilitate generation of analog control signals, the controller may also include a digital-to-analog converter (DAC) 96. The controller 80 can be a stand-alone controller, or the functionality of controller 80 can be carried out by another controller that also performs other functions, such as an electronic control unit (ECU) of the vehicle.

In order to receive, process, and manage wind data obtained by the LiDAR module 88 and generate the appropriate output signals (e.g., commands or data signals) for transmission to the controller 80, the computing device 70 may include a logic and memory system. The logic may be implemented in a variety of configurations, including software, hardware (analog and/or digital), and/or combinations of software and hardware. For example, the computing device 70 may include a processor 72, a memory 74, and input/output (I/O) circuitry 76. The memory 74 may include random access memory (RAM), read only memory (ROM), or any other type of digital data storage means. The I/O circuitry 76 may include conventional buffers, drivers, relays, etc., and the like, for receiving and sending signals. The computing device 70 can be a stand-alone device, or the functionality of the computing device 70 can be included in another module, such as the LiDAR module 88 or another controller that also performs other functions, such as an electronic control unit (ECU) of the vehicle.

In practice, commands or data signals may be transmitted to the controller 80 via an internal communications network such as a vehicle bus that uses a controller area network (CAN) protocol, a local interconnect network (LIN) protocol, and/or the like. Those of ordinary skill in the art will recognize that the vehicle bus may be implemented using any number of different communication protocols such as, but not limited to, SAE J1587, SAE J1922, SAE J1939, SAE J1708, and combinations thereof. In other embodiments, components may be connected by other networking protocols, such as Ethernet, Bluetooth, TCP/IP, and/or the like. In still other embodiments, components may be directly connected to each other without the use of a vehicle bus, such as by direct wired connections between the components. Embodiments of the present disclosure may be implemented using other types of currently existing or yet-to-be-developed communication systems without departing from the scope of the claimed subject matter.

In an embodiment, a CAN bus as specified by the SAE J1939 standard can be used to communicate vehicle operating conditions, control signals, and other information. However, in some situations it may not be desirable or practical to use a LiDAR module 88 that is capable of directly applying signals to the CAN bus. Instead, the LiDAR module 88 may communicate with the computing device 70 or other devices via a separate protocol such as Modbus—a communications protocol for connecting industrial computing devices.

In the example shown in FIG. 1, the controller 80 receives digital output signals from a computing device 70 (e.g., a microprocessor) that converts raw wind data obtained from the LiDAR module 88 into commands or data signals that can be interpreted and acted upon by the controller 80. In this way, the computing device 70 can act as an intermediary between the LiDAR module 88 and the controller 80, performing calculations and data formatting to convert wind data into actionable data signals for the controller 80. In this example, the computing device 70 is communicatively coupled (e.g., in a wired or wireless manner) to the LiDAR module 88. The computing device 70 is also communicatively coupled (e.g., via the CAN bus) to the controller 80.

In an illustrative operation scenario, the system of FIG. 1 (or of FIG. 4, as described in further detail below) is activated automatically (e.g., via a script) in response to an event such as an engine-on or key-on event, or on-demand (e.g., via a button or other input device in an operator interface). The system may enter an initial self-check or diagnostic mode to ensure that the system, including the LiDAR module, is operating normally. This helps to ensure that the LiDAR module is obtaining reliable wind data and to avoid unnecessary or counterproductive actions based on spurious data. (Similar checks can be performed during operation, with an option of shutting down the LiDAR module 88 if it is found not to be operating normally.) The system then checks for new wind data. For example, the computing device 70 may request such data from the LiDAR module 88 or determine whether such data may have already been transmitted to the computing device. Once obtained, the computing device 70 may process the wind data to generate actionable signals to transmit to the controller. As an example, if the LiDAR module 88 detects a 6 degree yaw and provides this information to the computing device 70, the computing device can use a look-up table or other technique to determine a corresponding angle of deflection (e.g., 45 degrees) for a corresponding aerodynamic device, such as an adjustable side deflector or sleeper/cab-fairing extender. The angle of deflection (or some other adjustment) can then be formatted into a command for transmission to the controller 80 (e.g., via a vehicle bus or wireless transmission).

Additional sensors or information sources (e.g., historic vehicle condition data or pre-programmed settings) may be used to provide other information that may be relevant to configuration of the aerodynamic devices 20. The system can use this additional information to make additional adjustments to the configuration or operation of the truck to further improve performance based on the detected conditions. For example, a sensor or pre-stored value may provide a gap distance between a tractor and trailer, and the system can determine whether further adjustments (e.g., a larger deflection angle) may be appropriate based on this information.

In one embodiment, the system includes a feedback system for attaining a desired configuration of a control surface, such as a desired amount of deflection. The feedback system may be provided, e.g., in the form of position sensors to detect an adjusted configuration of an aerodynamic device (e.g., a deflection angle). This information can then be returned to a controller or computing device to confirm that the desired adjustment has been achieved and/or is within a desired tolerance for the device.

Further details of illustrative aerodynamic devices and related systems will now be described. For the purposes of this detailed description, the term "substantially" when referencing a reference direction, such as "substantially align," "substantially aligned," "substantially parallel," "substantially coplanar," "substantially perpendicular," etc. shall be defined as an orientation that varies less than 30 degrees from the indicated reference direction. For instance, the term "substantially parallel" indicates that the inclination of the item in question deviates less than 30 degrees from a parallel orientation. Similarly, the terms "about," "approximately," "generally," etc., shall mean shall mean plus or minus 5% of the stated value or condition.

Figure 3:
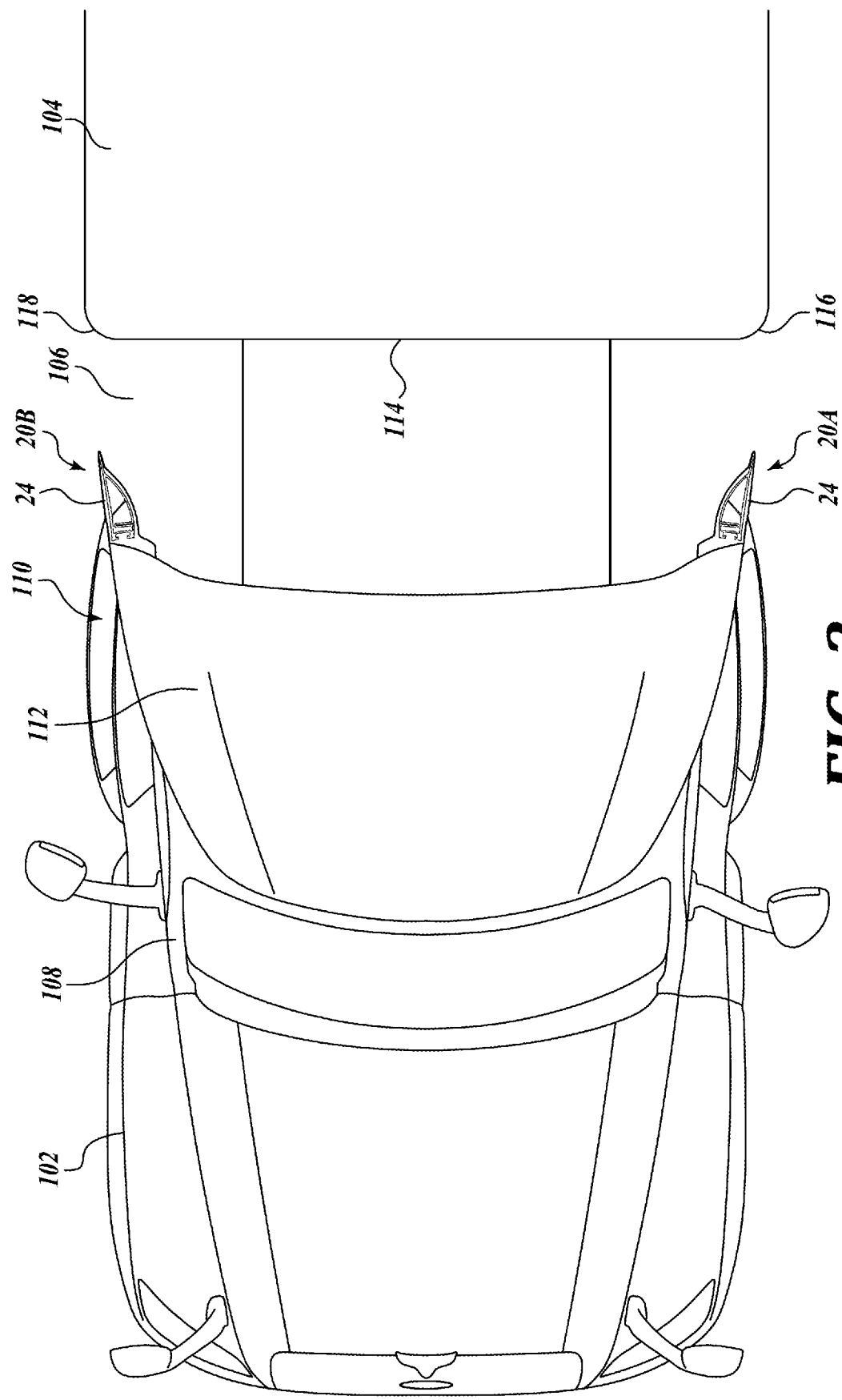
FIG. 3 is a diagram of an illustrative vehicle having aerodynamic devices installed thereon that may be used in accordance with embodiments of the present disclosure.

FIG. 3 is a diagram of an illustrative vehicle (e.g., tractor-trailer combination 100) having aerodynamic devices installed thereon that may be used in accordance with embodiments of the present disclosure. In the example shown in FIG. 3, first and second vehicle side deflectors 20A and 20B are coupled to the sides of a tractor-trailer combination. The vehicle side deflectors 20A and 20B, or any combination of components described herein, may be installed on new vehicles or may be retrofitted on existing vehicles. As shown in FIG. 3, the tractor-trailer combination includes a tractor 102 articulatedly connected to a trailer 104 by a so-called fifth wheel (not shown), the connection therebetween forming a space or gap 106. The tractor 102 includes a cab assembly 108 having a front end that generally houses an internal combustion engine that propels the combination and a rear end 110 that defines a generally vertically oriented rear wall (hidden by roof fairing 112) and left and right vertical trailing edges. The trailer 104 includes a trailer body that is generally rectangular in shape having a front wall 114. The LiDAR sensors (not shown in FIG. 3) may be installed in any location that permits effective emission of laser light pulses and detection of corresponding returns. Such locations may include a location on or near the top of the cab assembly 108.

In use, the side deflectors 20A and 20B provide improved air flow along the tractor 102 and gap 106 by delaying flow separation. The side deflectors 20A and 20B can also provide aerodynamic drag reduction during changing wind conditions, such as crosswind flow conditions between zero (0) and 20 degrees, and/or variable gap distances achieved, for example, via a sliding fifth wheel. The crosswind flow angle, or yaw angle, is measured from the vehicle longitudinal axis that also defines a typical direction of motion for the vehicle.

The side deflectors 20A and 20B may be utilized in lieu of conventional fixed cab side fairings. In the example shown in FIG. 3, the side deflectors 20A and 20B are fixedly mounted at the rear end 110 of the tractor 102 in close proximity to the left and right rear vertically oriented trailing edges cooperatively formed by, for example, the roof fairing 112 and cab extender fairings (not shown). As such, the side deflectors 20A and 20B span a portion of the gap 106 extending along the sides of the combination 20 between the rear end 110 of the tractor 102 and the front wall 114 of the trailer 104. When installed, the side deflectors 20A and 20B are aligned to direct at least a portion of the airstream passing along the sides of the tractor 102 to the sides of the trailer 104. To this end, the control surfaces 24 of the side deflectors 20A and 20B are oriented to direct a portion of the airstream towards the front corners 116 and 118 of the trailer 104 where the front wall 114 of the trailer 24 intersects with the trailer side walls. Oriented as described, the side deflectors 20A and 20B are oriented substantially parallel with a longitudinal axis of the combination 100.

In one embodiment, the side deflectors 20A and 20B are of a selected length chosen to permit the tractor 102 to pivot with respect to the trailer 104 about its fifth wheel in a selected angular range without the front wall 114 of the trailer 104 contacting the side deflectors 20A and 20B. The selected angular range is greater than about 45 degrees, and preferably over about 90 degrees. Ideally, the selected angular range is greater than about 180 degrees such that the tractor 102 may pivot 90 degrees to the left or right relative to the trailer without the trailer 104 impacting the side deflectors 20A and 20B. In one embodiment, the side deflectors 102 may be formed from a thermoplastic elastomer (TPE), such as Santoprene®, or other rubberized material, etc. In one embodiment, the side deflectors 20A and 20B have a height substantially equal to the height of the tractor 102 and/or trailer 104. In other embodiments, the height of the side deflectors 20A and 20B is selected so as to extend only a section of the tractor 102 and/or trailer 104. In an embodiment, the control surface 24 of the side deflectors 20A and 20B matches or is substantially similar with the profile of roof fairing 112 and cab extender fairings (not shown) so as to be substantially flush at the interface therewith. While shown as a unitary body, the side deflectors 20A and 20B may be composed of two or more sections.

Figure 4:
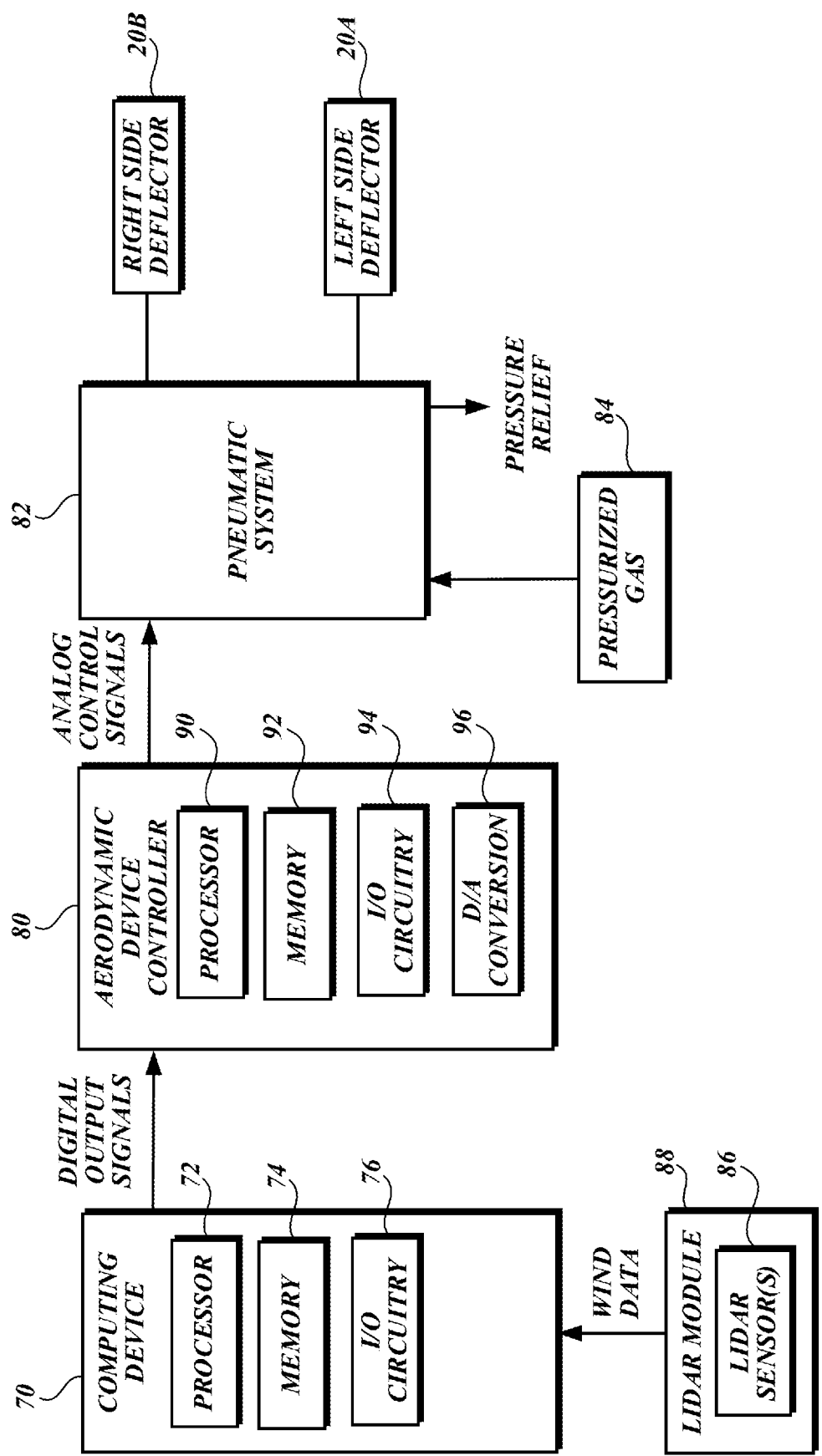
FIG. 4 is a block diagram of another illustrative aerodynamic device control system comprising a LiDAR module according to an embodiment of the present disclosure.

In accordance with as aspect of the present disclosure, pressurized gas supplied to pneumatic motors of pneumatically actuated aerodynamic devices can be controlled for selectively manipulating the configuration of a control surface between a normal configuration and a deflected configuration, as discussed below with reference to FIGS. 5-8. In that regard, FIG. 4 is a block diagram of another embodiment of the present disclosure that may be used to control such devices. In the example shown in FIG. 4, a controller 80 and pneumatic system 82 are provided to selectively control aerodynamic devices such as the deflectors 20A and 20B. This arrangement can be used control the supply of pressurized gas from a pressurized gas source 84 to chambers of pneumatic motors. For example, the controller 80 can be configured to adjust the deflection angle one or more deflectors of the design shown in FIG. 5 in a selective manner (either together or independently) between the configurations shown in FIGS. 6A-6C.

Figure 5:
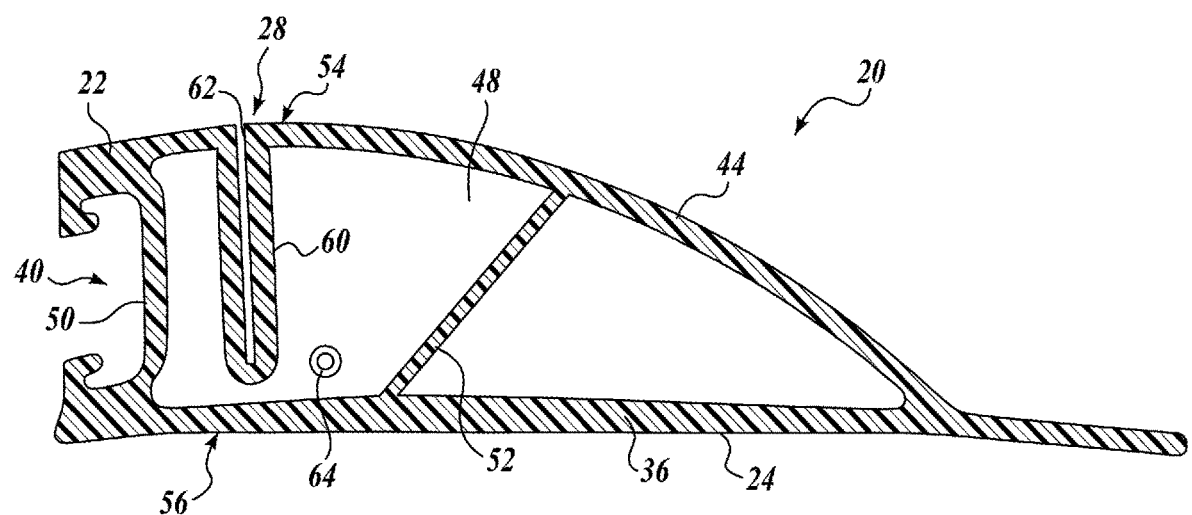
FIG. 5 is a diagram of an illustrative aerodynamic device that may be used in accordance with embodiments of the present disclosure.

The pneumatic system 82 may include a valve arrangement comprising one or more controllable valves, such as one or more solenoid actuated valves, for controlling the quantity of pressurized gas entering or exiting one or more pneumatic motors, such as the pneumatic motor 28 of the side deflector 20 depicted in FIG. 5. To that end, the pneumatic system 82 may receive appropriate device specific control signals from the controller 80 for opening and/or closing one or more valves in order to, e.g.: (1) pressurize a chamber so that the configuration of a control surface of the side deflector changes from the configuration of FIG. 6A to the configuration of FIG. 6B or 6C; or (2) depressurize a chamber so that the configuration of a control surface changes from the configuration of FIG. 6C to the configuration of FIG. 6B or 6A.

Figure 9A:
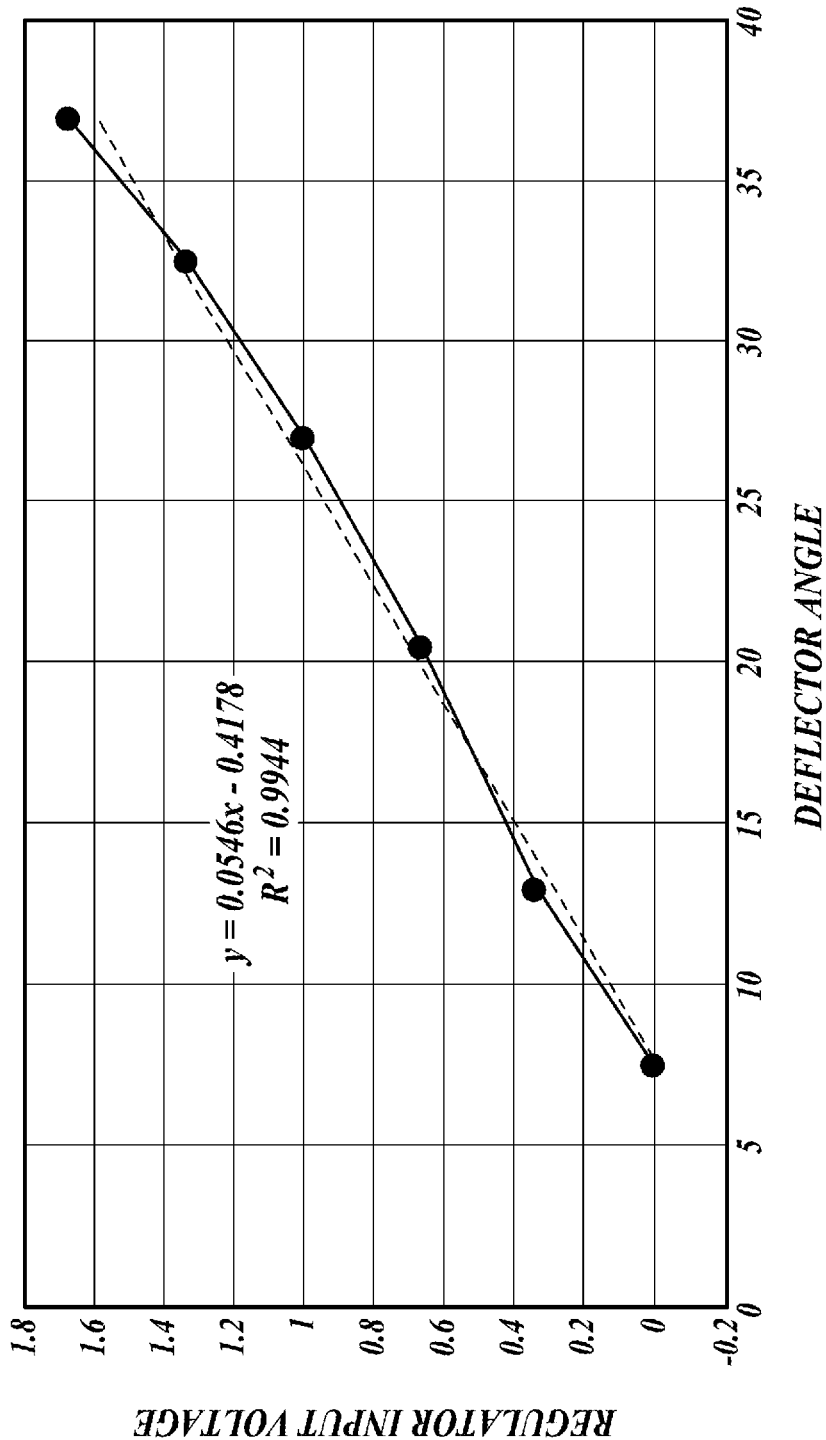
FIGS. 9A-9B are charts that depict an illustrative relationship between a voltage signal generated by an aerodynamic device controller and a corresponding deflector angle.
Figure 9B:
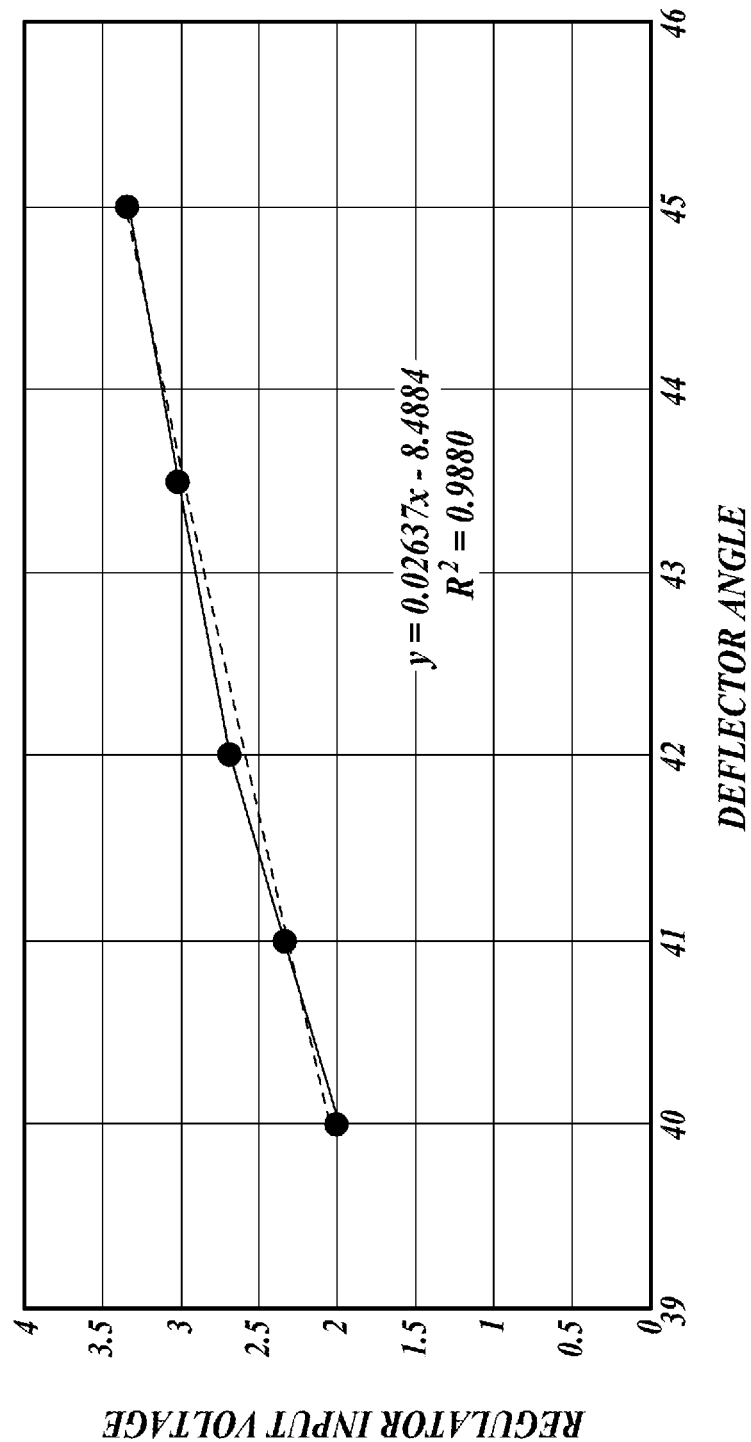

For example, the controller 80 can convert a command to adjust the angle of a side deflector (e.g., as received from the computing device 70 via the CAN bus) to a voltage output of 0-12 volts, where the specific voltage corresponds to a deflection angle. In this scenario, the voltage output can be used to activate a pneumatic valve and obtain the desired deflection angle by increasing or decreasing air pressure as dictated by the voltage level in the side deflector. An example of this approach is provided in FIGS. 9A-9B, which are charts that illustrate a proportional relationship between a voltage signal generated by a controller and a corresponding deflector angle. In this example, a higher voltage causes the valve to provide additional pressure, resulting in a larger deflection angle, whereas a lower voltage causes the valve to provider less pressure, resulting in a smaller deflection angle. It will be understood that other relationships can easily be substituted to accommodate adjustments of different ranges or levels of precision, or for causing adjustments in other pneumatic or electro-mechanical aerodynamic devices, or in other vehicle systems or components that may be useful for improving performance in response to wind data.

The illustrative side deflector depicted in FIG. 5 will now be described in more detail. The side deflector 20 is configured such that when selective air pressure is supplied to the motor 28, the control surface 24 or sections thereof changes its configuration or its orientation with respect to the air flow, thereby affecting the air flow with respect to the vehicle side deflector 20. The side deflector 20 includes an integrally formed body 22 having a substantially planar outer wall 36 defining the control surface 24. The body 22 also includes an end section 40 configured for suitable mounting, and in one embodiment, a generally arcuate inner wall 44 spanning between the end section 40 and a section of the outer wall 36.

In this embodiment, the pneumatic motor 28 is formed by the body 22 and includes a fluidly sealed chamber 48 delimited by end walls 50 and 52 and side walls 54 and 56, which are sections of the inner and outer walls 44 and 36, respectively. In the embodiment shown, the end wall 50 is formed as part of the end section 40 and the end wall 52 is formed by an internal bracing member that is oriented so as to from an obtuse angle with the side wall 56. The side wall 54 of the pneumatic motor 28 is formed with a U-shaped section 60, the outer ends of which are connected to forward (with respect to a vehicle when installed) and rearward wall sections that are connected to end walls 50 and 52. As such, the U-shaped section 60 forms an expansion relief 62. The pneumatic motor 28 further includes a fluidic port 64 configured to provide fluidic access into and out of the chamber 48.

Figure 6A:
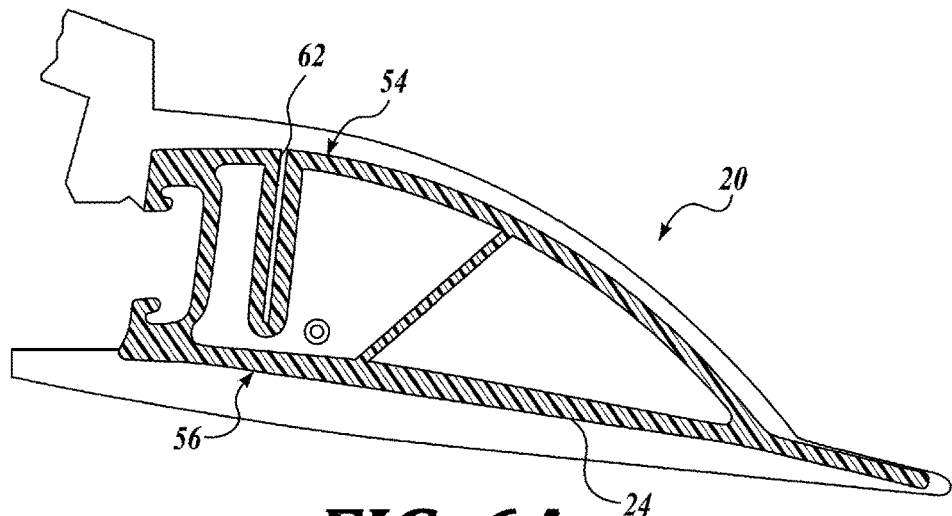
FIGS. 6A-6C are diagrams of illustrative configurations that the aerodynamic device of FIG. 5 can attain dynamically during use.
Figure 6B:
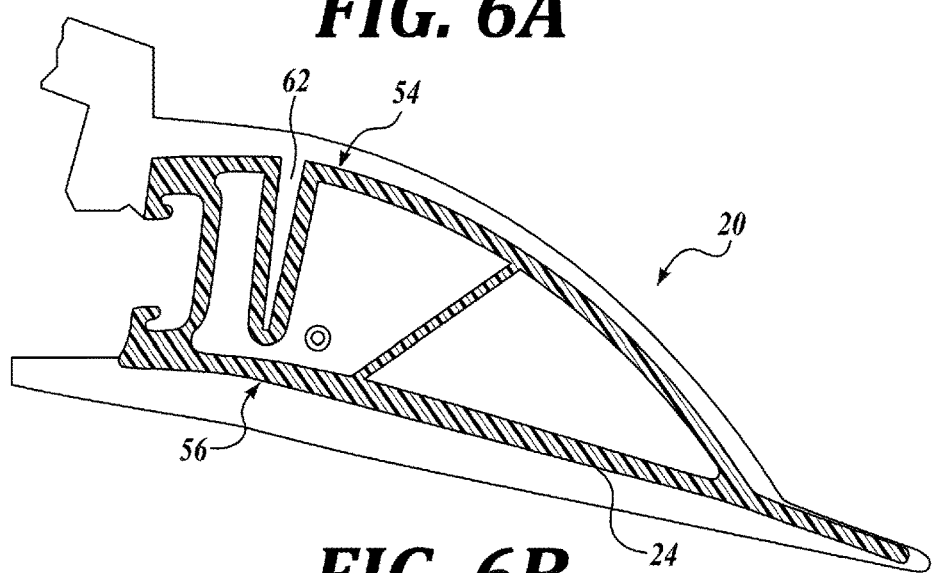
Figure 6C:
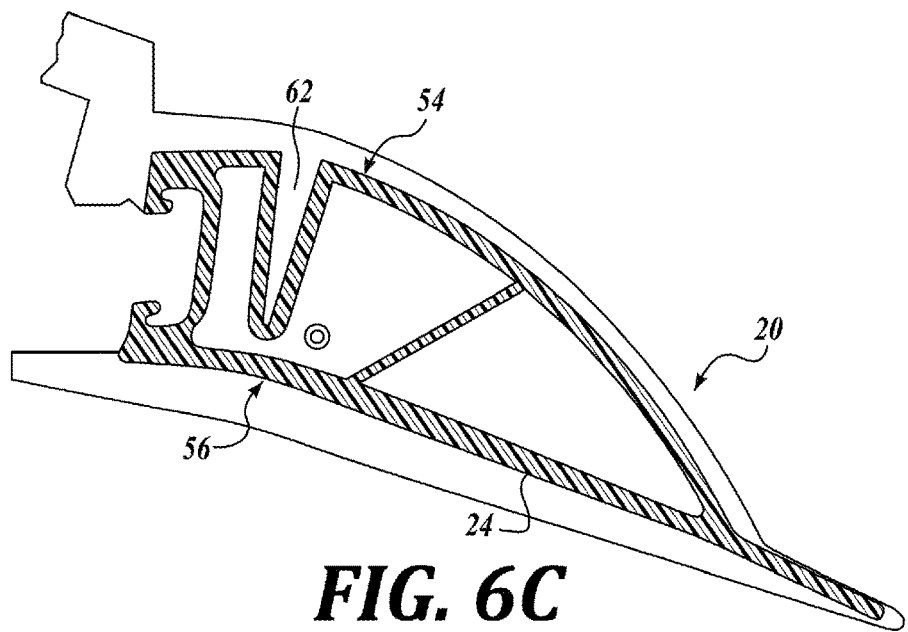

When air pressure is selectively supplied to the pneumatic motor 28 in accordance with one or more embodiments described herein, the side deflector 20 can deflect from a first, non-deflected position shown in FIG. 6A, to one or more deflected positions shown in FIGS. 6B and 6C. Once air of sufficient pressure is injected into the chamber, forces generated by the pressurized air contained in chamber 48 and exerted against the end walls 50 and 52 induce bending to occur in side wall 56 as a result of the expansion relief 62. When air is vented from the pneumatic motor 28, the control surface 24 may return to the configuration of FIG. 6A based on, for example, the construction materials of the body 22. The body 22 may be constructed of a thermoplastic elastomer (TPE), such as Santoprene®. To aid in returning the control surface 24 to a non-deflected or less deflected position, a spring or other biasing means can be employed.

Figure 7:
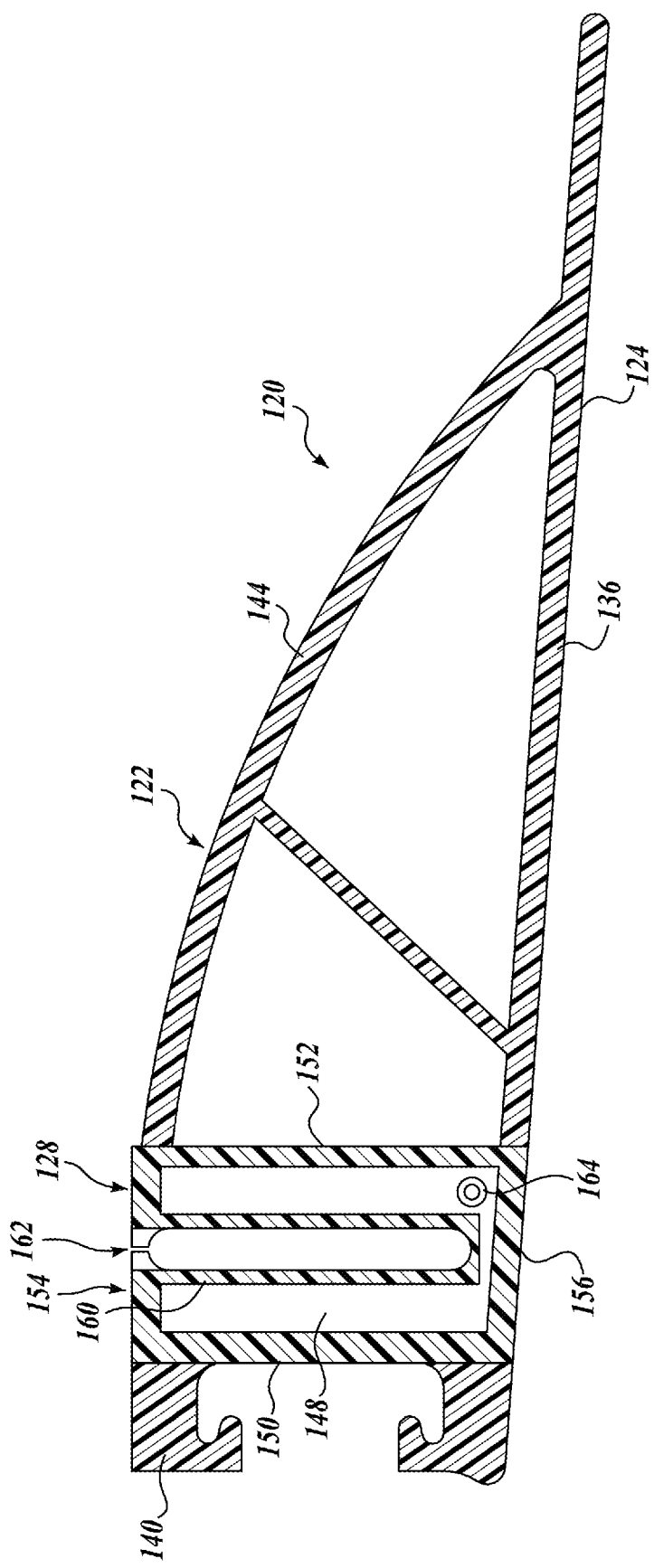
FIG. 7 is a diagram of another illustrative aerodynamic device that may be used in accordance with embodiments of the present disclosure.

FIG. 7 is a diagram of another illustrative aerodynamic device that may be used in accordance with embodiments of the present disclosure. In this example, the side deflector 120 is similar in construction, materials, and operation to the side deflector 20 of FIG. 5, with some differences that will now be described. As shown in FIG. 7, the pneumatic motor 128 is a discrete device mounted between an end section 140 and the remaining portions of the body 122, including the outer wall 136 and the inner wall 144. The outer side wall 156 of the pneumatic motor 128 forms a portion of the control surface 124. As such, an outer surface of the pneumatic motor 128 is flush with and co-extensive with a surface of the outer side wall 136. The pneumatic motor 128 includes a U-shaped, fluidly sealed chamber 148 delimited by end walls 150 and 152 and inner and outer side walls 154 and 156. The inner side wall 154 of the pneumatic motor 128 is formed with a U-shaped section 160, the outer ends of which are connected to end walls 150 and 152. As such, the U-shaped section 160 forms an expansion relief 162. The pneumatic motor 128 further includes a fluidic port 164 configured to provide fluidic access into/out of the chamber 148.

Figure 8:
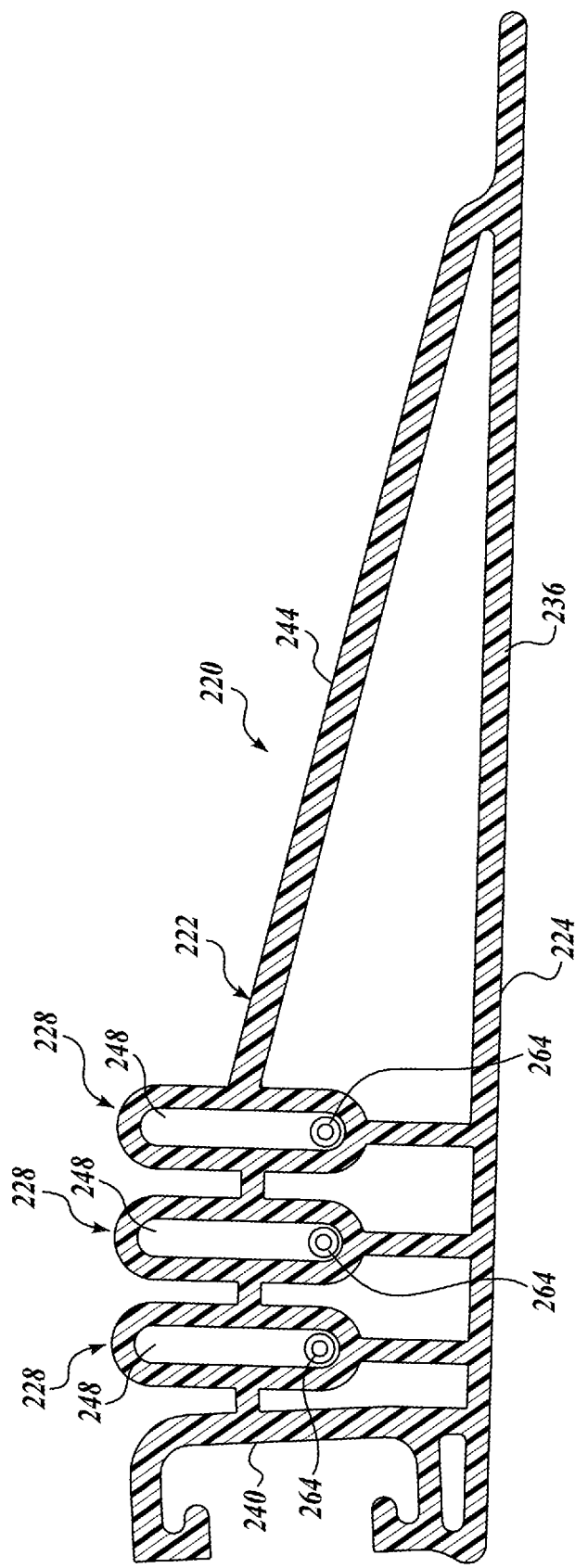
FIG. 8 is a diagram of another illustrative aerodynamic device that may be used in accordance with embodiments of the present disclosure.

FIG. 8 is a diagram of another illustrative aerodynamic device that may be used in accordance with embodiments of the present disclosure. In this example, the side deflector 220 is similar in construction, materials, and operation to the side deflector 20 of FIG. 5, with differences that will now be described. As shown in FIG. 8, a plurality of pneumatic motors 228 are integrally formed or otherwise coupled together in series between the inner side wall 244 of the body 222 and the end section 240. Each pneumatic motor 228 defines an elongated, fluid sealed chamber accessed by a fluidic port 264. In this example, the controller 80 can be configured to pressurize each pneumatic motor 228 at the same time in order to realize a plurality of control surface configurations. Or, the controller 80 can pressurize the pneumatic motors 288 in stages in order to realize a plurality of control surface configurations.

In any of the disclosed embodiments, a LiDAR module may be used to obtain wind data that can be translated into control signals generated by a controller to adjust the configuration of any of the disclosed examples of pneumatically actuated aerodynamic devices. For example, in any of the disclosed examples of pneumatically actuated aerodynamic devices, the fluidic ports may include a control valve controlled by the controller in this manner. In any of the disclosed examples of pneumatically actuated aerodynamic devices, a source of pressurized gas, such as air, may be operatively coupled in communication with the pneumatic motors via one or more fluidic ports. Such sources may include pressurized sources of air already existing on the vehicle, such as via an air brake system, or a stand-alone unit.

Extensions and Alternatives

Although embodiments are described herein as being useful for making adjustments to aerodynamic devices to improve aerodynamic performance of a ground vehicle, it should be understood that techniques and systems described herein may be used in other ways. For example, systems described herein may be modified to automatically alter the operation of a ground vehicle or other surface vehicle, such as a sailboat, based at least in part on wind data obtained by a LiDAR module such that the aerodynamic performance of the ground vehicle is improved. In an illustrative scenario, for a tractor-trailer combination, the wind data may indicate a flanking wind gust. In this situation, a controller can be activated to cause the cab of the tractor to lean into the flanking wind gust to shield a corner of the trailer and reduce the effect of the wind gust on the vehicle. Or, a steering-assist mechanism can be activated to counter-steer the vehicle into the flanking wind gust to reduce the effect of the wind gust on the vehicle. In another illustrative scenario, the wind data may indicate a position of a wake in a platoon, where one vehicle closely follows another to reduce drag and increase fuel efficiency for the trailing vehicle. In this situation, an auto-pilot mechanism can be activated to locate and maintain the position of the trailing vehicle in the platoon wake such that drag on the trailing vehicle is reduced. Similarly, a vehicle already operating in an auto-pilot mode can be positioned accordingly, based on the information provided by the wind data. In another illustrative scenario, a surface vehicle may automatically compensate for headwinds detected by the system described herein by reducing cruise speed in order to reduce effective air speed (a combination of surface speed and wind speed) to mitigate fuel economy deterioration. In another illustrative scenario, for a water surface vehicle such as a sailboat, the sails and rigging of the sailboat may be automatically adjusted to increase or maximize propulsive force, reduce or minimize yaw lean, or avert dangers of a sudden gust (microburst). Freighters and tankers are also affected greatly by any winds owing to their sheer size and surface area impinged upon by winds. In this situation, controls on the ship may adjust for wind in precision route maintenance through a narrow channel for example by pre-emptively crabbing according to real time winds ahead.

Many alternatives to the systems described herein are possible. Although illustrative details of vehicle computing systems are described with reference to FIGS. 1 and 4, it should be understood that alternative systems and methods can be implemented and used in accordance with the present disclosure. For example, some processing functionality that is described herein as being provided by a LiDAR module may instead be provided by a microprocessor or other computing device that is separate from the LiDAR module. Similarly, processing functionality that is described herein as being provided by a microprocessor or other computing device that is separate from the LiDAR module may instead be provided by the LiDAR module itself or by another device, such as an aerodynamic device controller. In this regard, a LiDAR module or aerodynamic device controller may be configured (e.g., programmed) to include additional functionality that renders other computing devices unnecessary for carrying out the described functionality. Further, it should be understood that, in practice, a fully-functional vehicle computer system may have additional components (e.g., sensors, control modules, output devices, input devices, and the like) that are not shown in FIGS. 1 and 4 for ease of illustration.

Many alternatives to the described techniques are possible. For example, processing stages in the various methods can be separated into additional stages or combined into fewer stages. Processing stages in the various methods also can be omitted or supplemented with other methods or processing stages. Furthermore, processing stages that are described as occurring in a particular order can instead occur in a different order and/or in a parallel fashion, with multiple components or software processes concurrently handling one or more of the illustrated processing stages. As another example, processing stages that are indicated as being performed by a particular device or module may instead be perforated by one or more other devices or modules.

It should be understood that aspects of the systems and related processes described herein transcend any particular type of vehicle and may be applied to vehicles employing an internal combustion engine (e.g., gas, diesel, etc.), hybrid drive train, or electric motor.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

The embodiments of the invention in which an exclusive property or privilege is claimed are defined as follows:

1. A method for modifying operation of a surface vehicle to improve aerodynamic performance of the surface vehicle, the method comprising:
   by a LiDAR (light detection and ranging) module including at least one LiDAR sensor mounted on the surface vehicle, obtaining wind data for a location upstream of the surface vehicle; and
   automatically altering the operation of the surface vehicle based at least in part on the wind data obtained by the LiDAR module such that the aerodynamic performance of the surface vehicle is improved, wherein the wind data indicates a platoon wake, and wherein automatically altering the operation comprises locating and maintaining a position of the surface vehicle in the platoon wake.

2. The method of claim 1, wherein the surface vehicle is a tractor-trailer combination comprising a tractor articulatedly connected to a trailer, wherein the wind data indicates a flanking wind gust, and wherein automatically altering the operation comprises leaning a cab of the tractor into the flanking wind gust to shield a corner of the trailer.

3. The method of claim 1, wherein the surface vehicle is a ground vehicle, wherein the wind data indicates a flanking wind gust, and wherein automatically altering the operation comprises activation of a steering-assist mechanism to counter-steer the ground vehicle into the flanking wind gust.

4. The method of claim 1, wherein the wind data indicates a headwind ahead of the surface vehicle, and wherein automatically altering the operation comprises reducing cruise speed in order to reduce effective air speed to mitigate fuel economy deterioration.

5. A control system for a surface vehicle comprising:
   a LiDAR (light detection and ranging) module including at least one LiDAR sensor mounted on the surface vehicle, obtaining wind data for a location upstream of the surface vehicle; and
   a computing device comprising at least one processor and memory, wherein the memory stores instructions that, when executed by the at least one processor, cause the computing device to:
   receive the wind date from the LiDAR module; and
   automatically alter the operation of the surface vehicle based at least in part on the wind data such that the aerodynamic performance of the surface vehicle is improved, wherein the wind data indicates a platoon wake, and wherein automatically altering the operation comprises locating and maintaining a position of the surface vehicle in the platoon wake.

6. The control system of claim 5, wherein the surface vehicle is a tractor-trailer combination comprising a tractor articulatedly connected to a trailer, wherein the wind data indicates a flanking wind gust, and wherein automatically altering the operation further comprises leaning a cab of the tractor into the flanking wind gust to shield a corner of the trailer.

7. The control system of claim 5, wherein the surface vehicle is a ground vehicle, wherein the wind data indicates a flanking wind gust, and wherein automatically altering the operation comprises activation of a steering-assist mechanism to counter-steer the ground vehicle into the flanking wind gust.

8. The control system of claim 5, wherein the wind data indicates a headwind ahead of the surface vehicle, and wherein automatically altering the operation further comprises reducing cruise speed in order to reduce effective air speed to mitigate fuel economy deterioration.

9. A surface vehicle comprising:
   a drive train;
   a LiDAR (light detection and ranging) module including at least one LiDAR sensor mounted on the surface vehicle, obtaining wind data for a location upstream of the surface vehicle; and
   a computing device comprising at least one processor and memory, wherein the memory stores instructions that, when executed by the at least one processor, cause the computing device to:
   receive the wind date from the LiDAR module; and
   automatically alter the operation of the surface vehicle based at least in part on the wind data such that the aerodynamic performance of the surface vehicle is improved, wherein the wind data indicates a platoon wake, and wherein automatically altering the operation comprises locating and maintaining a position of the surface vehicle in the platoon wake.

10. The surface vehicle of claim 9, wherein the surface vehicle is a tractor-trailer combination comprising a tractor articulatedly connected to a trailer, wherein the wind data indicates a flanking wind gust, and wherein automatically altering the operation further comprises leaning a cab of the tractor into the flanking wind gust to shield a corner of the trailer.

11. The surface vehicle of claim 9, wherein the surface vehicle is a ground vehicle, wherein the wind data indicates a flanking wind gust, and wherein automatically altering the operation comprises activation of a steering-assist mechanism to counter-steer the ground vehicle into the flanking wind gust.

12. The surface vehicle of claim 9, wherein the wind data indicates a headwind ahead of the surface vehicle, and wherein automatically altering the operation further comprises reducing cruise speed in order to reduce effective air speed to mitigate fuel economy deterioration.

* * * * *